3,669,796
ADHERING RESINS TO SUBSTRATES, ESPECIALLY METAL, BY RADIATION
Roger P. Hall, Mayfield Heights, and Ivor Pratt, Strongville, Ohio, and Richard A. Young, Buffalo Grove, Ill., assignors to SCM Corporation, New York, N.Y.
No Drawing. Filed Oct. 3, 1968, Ser. No. 764,959
Int. Cl. B29c 27/04
U.S. Cl. 156—272
16 Claims

ABSTRACT OF THE DISCLOSURE

A process for coating by radiation a substrate, and especially one having a metallic surface, with a substantially catalyst-free system containing a polymerizable organic unsaturated resin susceptible to free-radical catalysis; and the resulting product. In one form, a film of the resin is superimposed upon the substrate while a facing side of either the resinous film or substrate is contacted at any time prior to such radiation with an organic substituted, radiation-responsive silane, or derivative thereof such as a siloxane or polysiloxane of the silane. Thereafter, the film and substrate are subjected to the high energy radiation to adhere one to the other.

The process is also adapted for coating articles with normally air-inhibited, thermosetting resins by a two-step process, wherein the resin film is first passed through one treating zone effective to impart mass integrity and thereby define a sheet, and the sheet together with the silane and the substrate is then passed through another treating zone effective substantially to complete the cure of the resin and simultaneously adhere the sheet to the substrate, at least one of the treating zones comprising exposure to high energy radiation.

CROSS REFERENCES TO RELATED APPLICATIONS

The subject matter of this application relates to two prior applications filed in the name of Roger P. Hall, one entitled "Curing Air-Inhibited Resins by Radiation," filed Nov. 13, 1967 and assigned Ser. No. 682,140; and the other entitled "Producing a Laminable Sheet by Radiation," filed June 17, 1968 and assigned Ser. No. 737,576.

BACKGROUND OF THE INVENTION

In many industrial applications, it is necessary to resin-coat a substrate either for preserving the substrate or for facilitating other machining or shaping operations on it. The coating preferably should remain continuous in spite of the stresses and strains to which the substrate may be subjected. This is especially true in the case of metal such as in the coating of metal sheets or coils. Since such sheets and coils are often subjected to severe fabricating operations like pressing, stamping, and/or drawing to produce, for example, bottle caps, it is necessary that the resin have a strong adherence to the metal to withstand these operations. Usually, a fairly acceptable bond with a resin can be accomplished by a high-temperature bake which, however, is time-consuming and relatively expensive. The resinous systems employed to coat metal and the like by a high-temperature bake further require certain levels of catalysts for polymerizing the resin at the temperature of the bake. This also adds to the cost in materials and labor to prepare the finished product. It would accordingly advance the art of producing a strongly-adherent resin coat to metal and the like if the need for a high-temperature bake were eliminated, and if the requirement for a high-temperature catalyst were likewise obviated or substantially reduced.

An additional, related problem arises in that many thermosetting resins used to coat metal sheets and the like, such as those typified by thermosetting, unsaturated polyester resins, exhibit air-inhibited curing at their air-contacting surfaces. Such surfaces are softer than the interiors of the resins and are therefore more easily scratched and marred. Obviously, these qualities are undesirable, especially when such a resin is to be used for coating purposes. Several techniques have been suggested to overcome air-inhibition in the curing of resins. For example, U.S. Pat. 3,210,441 to Dowling et al. is based on the discovery that the presence of esterified residues of monohydroxy acetals in polyester resins of particular formulation are free of air-inhibition.

Within relatively recent years, the polymerization of resinous materials by electron radiation has increasingly become of interest. However, the use of this technique has encountered the same difficulty with many thermosetting resins, namely, air-inhibition at the resin-air interface. During penetration by high energy radiation, the resinous material undergoes an "ionization effect" which induces chemical reactions including polymerization; note U.S. Pat. 2,863,812 to Graham. Radiation, such as a beam of electrons, has not been found to have any appreciable ionization effect at the exposed surface of irradiated material. The desired ionization effect is obtained only after penetration of the resinous material. Previous attempts have been directed to modifying the radiated energy so as to obtain an ionization effect after relatively short distances of penetration. For example, in U.S. Pat. 2,863,812 to Graham, electrons pass through an electrically conductive shield before impinging upon the material to be radiated. This technique, of course, increases and complicates the type of apparatus used for the radiation. Also not all materials, even closely related materials, necessarily react in the same manner upon exposure to high energy radiation.

SUMMARY OF THE INVENTION

In accordance with the present invention, a strongly-adherent coating to a substrate, including one with a metallic surface, is obtained with a substantially catalyst-free system containing a polymerizable organic unsaturated resin, susceptible to free-radical catalysis, by utilizing high energy radiation at relatively low temperatures, for example at room temperatures, without requiring any chemical modification of the resin itself or additional and complicating radiation apparatus. To obtain the strong adherence of the resin coat, an organic substituted silane is employed as an adhesion promoting agent which is responsive to the high energy radiation. The silane has at least one substituent that is halogen, alkoxy, or aryloxy; and at least one organic substituent that is aliphatic, cycloaliphatic, or aromatic and preferably carbon-to-carbon unsaturated other than aromatic unsaturation. Derivatives such as polysiloxanes based on such silanes may also be used.

When the resin is normally air-inhibited with respect to curing to a hard, mar-resistant state, the same, substantially one-step process may still be used. However, a two-step process may, if desired, be followed to insure that a tacky finish is avoided. In this case, a film of the resin is passed successively through at least two treating zones. The objective of the first zone treatment is to impart a tack-free, mar-resistant surface to a shielded side of the film while the side of the film open to the atmosphere characteristically remains relatively tacky and mar-susceptible. This first zone treatment also serves to impart mass integrity to the film so that it may thereafter be treated as a self-supporting sheet, although portions of the resin in the film may still be capable of further cure. The objective of the second zone treatment is to complete all possible further cure of the resin and to energize as well the organosilicon compound, so as to laminate the relatively tacky side of the film to a cooperating lamina or substrate which, as indicated, takes the usual form of adhering a resin coat to a metal article.

High energy radiation must be used at one of the zones. The use of such radiation avoids the need for a polymerization catalyst or greatly reduces the need to a relatively small or insignificant amount. If high energy radiation is not employed at both treating zones, any heat generating source, such as an infra-red lamp, heated drum, gas oven, or the like may be employed at the radiation-free zone. Use of any of these alternate means as an initial treatment does, for example, impart a non-tacky, mar-resistant surface at the shielded side of the resin film at the first zone while leaving the opposite side of the film relatively tacky and mar-susceptible. It is preferred, however, to use high energy radiation in both treating zones and especially the last. The use of high energy radiation also eliminates the need for elevated temperatures as in a high-temperature brake.

DESCRIPTION OF THE PREFERRED EMBODIMENTS

The resin systems contemplated by the present invention are those containing polymerizable, organic, unsaturated resins, which are subjected to free-radical catalysis. Usually, no polymerization catalyst at all is needed, although when the resin is not exposed to high energy radiation in one of the described two-step process, a relatively small amount of conventional polymerization catalyst may be used, for example, about one percent or less by weight of the resin.

The resin systems may include those exhibiting inhibition to cure in the presence of air, oxygen being generally considered to be responsible for inhibiting or even preventing a desired cure to a non-tacky state. Thus the term "air-inhibited resin" is taken to mean a resin which does not cure as well, with respect to forming a tack-free, mar-resistant finish, in the presence of air as the resin does when protected from air. Many resins suffer in some degree, more or less, from this shortcoming. Usually such resins contain appreciable amounts of unsaturated, carbon-to-carbon linkage, such as unsaturated, organic polymerizable materials having pendant acrylic, methacrylic, maleic, and fumaric groups; or reaction products like copolymers of isobutylene and conjugated diolefins such as isoprene, butadiene styrene, butadiene acrylonitrile, and the like. As a rule, this class of resins includes those which polymerize under conditions known in the art as free-radical catalysis. A specific example of an air-inhibited resin is the condensation-product of three moles of hydroxypropyl methacrylate and one mole of hexamethoxymethylmelamine. The resulting product can be cured in accordance with the present invention either as so condensed or as further reacted with an olefinic compound such as a vinyl monomer like styrene. The olefinic compound may serve as a solvent for the resin, or if desired, a non-reactive, fugitive solvent may be used.

However, a commonly used class of resins in the practice of the invention is unsaturated polyester resins, especially when blended with one or more reactive olefinic, unsaturated compounds, such as vinyl monomers, which serve as cross-linkers. It is the cross-linking which is difficult to realize to a maximum obtainable degree by ordinary techniques in an oxygen atmosphere.

Such polyesters are well known in the art and may, for example, be derived from reaction between glycols including ethylene, propylene, butylene, diethylene, dipropylene, trimethylene, and triethylene glycols, and triols like glycerine; and unsaturated poly-basic acids including maleic acid and maleic anhydride, fumaric acid, chloromaleic acid, itaconic acid, citraconic acid, mesaconic acid, and the like.

Typical cross-linking monomers include styrene, vinyl toluene, methyl methacrylate, alpha-methyl styrene, divinyl benzene, dichlorostyrene, lower dialkyl maleates, and lower dialkyl fumarates. Still other useful cross-linkers include: ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, trimethylol propane triacrylate, trimethylol propane trimethacrylate, hydroxyethyl acrylate, hydroxyethyl methacrylate, hydroxypropyl acrylate, and hydroxypropyl methacrylate.

A minor portion, that is, up to about 40 mol percent, of the unsaturated acid can be replaced with saturated and/or aromatic polycarboxylic acids or their chlorinated counterparts. Typical acids which can be used for the indicated replacement are phthalic, isophthalic, adipic, pimelic, glutaric, succinic, suberic, sebacic, azelaic, chlorinated phthalic, tetrahydrophthalic, hexahydrophthalic anhydride, and the like.

In general, the nature of the substrate is not critical. Wood, plastics, metal, paperboard, and the like may be used. In some instances, the type of radiated energy employed may influence the choice of the substrate. However, the present invention is especially intended for bonding a resin film or coat to a metal surface such as those of aluminum, zinc, iron, steel and oxides and alloys thereof. Many metals like aluminum have a surficial oxide or hydroxide coating which may aid in obtaining a chemical adherence.

As used here and in the claims, the term "high energy radiation" is taken to include particle emission or electromagnetic radiation. The particles can be electrons, protons, neutrons, alpha-particles, etc. The electromagnetic radiation can be radio waves, microwaves, infrared waves, ultra violet waves, X-rays, gamma rays, and the like. The radiated energy may be applied to the resinous material in one or more doses for each of the described exposures. As a general guide, only that amount of energy need be applied in any case that completely penetrates and cures the resin, as herein contemplated, and within a time period at least comparable to that for a conventional heat-activated reaction for the same material. Excess energy is not only wasteful, but may result in undesired heating of the resinous material and attendant apparatus with possible charring and other decomposition. The amount of energy required depends on several factors, such as the nature and thickness of the resinous film; extent of prior cure, if any; distance between the energy source and resin; and the like. The requisite amount of energy for any given situation may be readily determined by trial and error.

With respect to electron bombardment, suitable sources of radiation include radioactive elements, such as radium, cobalt 60, and strontium 90, Van de Graaff generators, electron accelerators, and the like. The accelerators or guns, where used, may be of the type supplying an average energy from about 100 to about 300 kev. (thousand electron volts), although much higher voltages can be used, at about 10 to 1,000 milliamperes or even higher. As reported in British Pat. 949,191, in most commercial applications of irradiation techniques, electrons have been used having an energy of between 500 to 4,000 kev. Such electrons have a useful penetration of about 0.1 to about 0.7 inch in organic material having a specific gravity of around one. As another measure of radiation, U.S. Pat. 3,247,012 to Burlant discloses that the potential of an electronic beam for radiation purposes may be in the range of about 150,000 to about 450,000 volts.

By microwaves and microwave energy is meant electromagnetic wave energy. Microwaves can be generated by radio frequency power tubes such as the magnetron, amplitron and klystron. Their frequencies range between about 300 mHz. and 300,000 mHz., "mHz." designating one megahertz and being equal to $10^6$ cycles per second. U.S. Pat. 3,216,849 to Jacobs describes and illustrates one type of microwave generator which may be used. Normally, a 10 to 50 second exposure to microwaves suffices for curing a film of resinous material, depending on the intensity of the microwaves and thickness of the film. A polymerization catalyst may be required in the resin mix when microwaves are used, for example from about one-fourth to one-half of the normal amount, but electron beams usually entirely eliminate the need for catalyst.

Polar resinous materials like polyester-reactive resins much more readily absorb microwave energy than nonpolar materials. However, unlike electron beams, microwaves can reach sharply indented parts and require much less shielding. If desired, a combination of high energy radiation with a low level of a polymerization catalyst in the resin mix may be used.

Silanes contemplated by the present invention have the following general formula:

$$R_m R_n'SiX_p$$

wherein R is a substituent selected from the group consisting of aliphatic radicals and cycloaliphatic (alicyclic) radicals up to about eight carbon atoms and aromatic radicals up to about 12 carbon atoms; R' is a substituent selected from the group consisting of hydrogen, saturated aliphatic and cycloaliphatic radicals up to about eight carbon atoms, and saturated aromatic radicals up to about 12 carbon atoms; X is a substituent selected from the group consisting of halogens, alkoxy radicals up to about five carbon atoms, and the aryloxy radicals up to about 10 carbon atoms; $m$ can be 1, 2, or 3; $n$ can be 0, 1, or 2; and $p$ can be 1, 2, or 3, the total of $m$, $n$, and $p$ always being 4.

While R can be saturated aliphatic cycloaliphatic, and aromatic (and represent, for example, the carbon-containing radicals hereinafter given for R'), it is preferred for R to be polymerizable and have at least one carbon-to-carbon unsaturation other than aromatic unsaturation. As examples, R may be vinyl, propenyl, isopropenyl, acrylic, methacrylic, ethylacrylic, butenyl, isobutenyl, vinylene benzene, propylene benzene, butylene benzene, and vinylene toluene. R may also have diolefinic unsaturation. R' may be hydrogen, methyl, ethyl, propyl, isopropyl, butyl, isobutyl, phenyl, benzyl, toluyl, xylyl, etc. X may be chloro, bromo, fluoro, iodo, methoxy, ethoxy, propoxy, butoxy, phenoxy, tolyloxy, xyloxy, etc. Representative silanes include: vinyl trichloro silane, vinyl triethoxy silane, vinyl tris (2-methoxyethoxy) silane, gamma methacryloxypropyltrimethoxy silane, vinyl trimethoxy silane, allyl trichloro silane, diallyl diethoxy silane, methallyl trichloro silane, allylphenyl dichloro silane, allylmethyl diethoxy silane, dimethallyl diethoxy silane, styryltrichloro silane, and the like.

Although the silanes are preferred and especially those where R is unsaturated, the present invention also contemplates certain derivatives of such silanes. For example, the corresponding siloxanes and polysiloxanes having a molecular weight up to about 10,000 may be used, although preferably the polymers have a maximum molecular weight of about 5,000. Reference is made, for example, to U.S. Pat. 2,683,097 to Biefeld which discloses certain polysiloxanes.

It is also possible to use water-soluble salts of the siloxanes and polysiloxanes. For instance the water-soluble sodium, potassium, lithium, and ammonium salts of such siloxanes and polysiloxanes may be employed, such as sodium diallyl polysiloxanolate. Similarly, the siloxanes may be used as modified by treatment with an alkyd resin. Polysiloxanols cobodied with an alkyd or a monocarboxylic acid-modified alkyd composition are described in U.S. Pat. 2,633,694 to Millar. In these compositions the alkyd resins and polysiloxanols are cobdied in such proportions that the alkyd resin amounts to about 25 percent to 90 percent by weight, and the polysiloxanols amount to about 10 percent to 75 percent by weight. In the present case, the alkyd resins preferably are not modified with vegetable or linseed oils.

In practice, a resinous mix substantially catalyst-free and adapted for radiation cure is shaped by standard means into the form of a film, layer or coat. Since the cure of the resin is to be in situ, the resin mix may be a solvent-free, polymerizable admixture of the reactive ingredients. Such a mix may have previously undergone some polymerization but to a degree not sufficient to alter the substantially fluid character of the mix. Of course, the mix may, if desired, contain a non-reactive solvent which in time evaporates.

In general, a film of a resin is superimposed over the substrate with an intervening coat of a silane material of the present invention. This coat should preferably be continuous and have a thickness dictated largely by the strength of the bond desired. As an example, the coat of the adhesion promoter may be about 0.01 mil to about 5 mils thick. The silane component may be applied from an aromatic solution, such as from benzene or toluene solutions containing from about one percent to about 15 weight percent of the silane ingredient, although concentrations from about three percent to about six percent by weight are more commonly used. Also since certain silanes are liquids themselves, it is possible to avoid use of a solvent. Thereafter the laminated assembly is exposed to high energy radiation to effect a strong, chemical bond among the resinous film, silane component, and the substrate. If desired, the silane component can be admixed with the polymerizable resinous mix or applied as a coat or layer directly either to a film of the resin or to the metal or other substrate.

When the process of the invention involves use of an air-inhibited resin of the type previously described, it is preferred to use at least two treating zones in order that the outer side of the film (as bonded to the substrate) is hard and mar-resistant. The first treating zone is designed to advance the cure of the resin at least to a point sufficient to impart mass integrity to the assembly and thereby define a sheet and to provide a tack-free, mar-resistant surface on a shielded side. This can be accomplished either by exposing the assembly preferably to high energy radiation; or by exposing it to heat sufficient to obtain the result desired, as long as radiation is then employed in the second treating zone. This treatment as adapted for the present process uniquely takes advantage of the air-inhibition. The resinous shielded face of the assembly, contiguous to a substrate, cures to a non-tacky and mar-free condition, while the upper surface of the assembly, exposed to the atmosphere, remains relatively soft, tacky, and mar-susceptible. In general, an appreciable part of any volatile solvent, which may be present in the resin mix, is also driven off in the first zone treatment.

In the second treating zone, as the sheet overlies the substrate with an intervening coat of the silane adhesion promoter, the entire combination is subjected either to high energy radiation or to heat to effect a chemical bonding of the soft tacky side of the sheet, now shielded from the atmosphere, to the substrate which it now overlies. Radiation must be used at one of the treating zones and preferably at both zones.

One chief advantage of using a silane component as described is that such materials are also triggered into reaction by the radiation, so that the entire assembly is simultaneously finally cured and bonded together by the same radiation exposure to form a laminate.

At any time prior to the final laminating step, the resin film may be stretched to reduce its gauge or thickness. This technique is especially useful when quite thin films are desired, and it is not feasible to work with such thin films prior to a final cure. For example, films may be stretched to reduce their thickness from about 10 mils to about two mils. The film may, however, be stretched to a point short of forming pinholes, tears, and the like.

The following examples are intended merely to illustrate the invention and should not be construed as limiting the claims.

EXAMPLE 1

A thermosetting polyester resin was prepared by reacting equal molar portions of 1,3-propylene glycol and maleic anhydride. Water was removed until the resin had an acid number of 35. An amount of 70 parts of the cooled reaction product was then mixed with 30 parts of styrene monomer, all by weight.

A supply of the resulting polyester resin mix was periodically dumped onto a slowly rotating drum having a chrome plated surface to minimize adherence with the mix. A doctor knife smoothed the mix to a film form. An electron accelerator of standard construction bombarded the film with a radiation of 20 megarads as it passed on the drum at a rate of about 20 feet per minute. In general, the radiation strength of the gun and the speed of rotation of the drum are synchronized to cure at least enough of the film that it has sufficient mass integrity to be stripped from the drum as by a knife edge without rupturing; and also to provide a tack-free, hard undersurface to the film as previously described. If high energy radiation had not been used for this step, the drum could have been internally heated as by steam; or the gun could have been replaced by an infra-red lamp, an oil or gas-fired burner, or the like.

After the film has left the drum, the side which was exposed to the atmosphere passed over a roller-coater to receive a coating of vinyl trichloro silane which itself is liquid. To apply a thinner layer of this relatively expensive silane, it could be applied from a five percent benzene solution. The film was next superimposed, wet side down, on a flexible iron sheet supported on a continuous conveyer, and the assembly was then passed beneath a second accelerator gun. The resulting exposure to radiation not only completed any possible further cure of the polyester film but also triggered other reactions chemically to bond together the resinous film and iron sheet. A schematic illustration of the process of this example is shown in the previously cited applications, Ser. No. 682,140 and Ser. No. 737,576.

EXAMPLE 2

An unsaturated polyester resin was prepared by reacting 696 grams of ethylene glycol and 2128 grams of propylene glycol with 3098 grams of isophthalic acid and 2249 grams of maleic anhydride until esterification was substantially complete, as indicated by an acid number of about 15 to 20. The resulting polyester was then admixed with 2249 grams of styrene.

A procedure was carried out with this resin mix like the procedure of Example 1, except that after the initial radiation exposure on the drum, the laminable sheet was removed and cut to size. In the meanwhile, a flexible aluminum foil was brushed on one side with a three percent toluene solution of diallyl diethoxy silane. The cut laminable sheet was then pressed against the wetted side of the aluminum foil and the assembly exposed at room temperature to ten megarads of high energy radiation. The radiation cured the polyester resin and activated the silane to yield a strong, chemical bond between the polyester resin and the aluminum foil.

EXAMPLES 3-4

Procedures were carried out like the procedure of Example 1 except that the silane ingredient, in one instance, was a 1.5 percent by weight aqueous solution of sodium diallyl polysiloxane (or polysiloxanolate); and in the other instance was a one percent by weight aqueous solution of sodium divinyl polysiloxane.

EXAMPLE 5

A procedure was carried out like that of Example 2 except that an alkyd modified polysiloxane was used as the adhesion promoter. This polysiloxane was prepared in accordance with Example 1 of U.S. Pat. 2,663,694 to Millar. In particular, a monocarboxylic acid modified alkyd was prepared by refluxing hexoic acid, glycerine, phthalic anhydride, and xylol for about 32 hours to an acid number of 4.0. This batch was reduced to 70 percent solids with xylol.

The resulting alkyd was next cobodied with a polysiloxanol solution on a weight basis of 46 percent alkyd to 54 percent polysiloxanol solution. The latter consisted of a xylene solution of the hydrolysis and partial condensation product prepared from an equal molar mixture of phenyl trichloro silane, methyl trichloro silane, and monophenyl monomethyl dichloro silane. The indicated mixture was hydrolyzed by adding it to an agitated mixture of water and toluene. The hydrolyzed mixture had a total of 1⅓ methyl and phenyl radicals per silicon atom, an equal number of methyl and phenyl radicals, and a hydroxyl content of 3.61 percent by weight.

All patents cited are hereby incorporated by reference. While the foregoing describes preferred embodiments and various modifications of the invention, it is understood that the invention may be practiced still in other forms within the scope of the following claims.

What is claimed is:

1. A process for bonding to a substrate a substantially catalyst-free system containing a polymerizable organic unsaturated resin susceptible to free-radical catalysis comprising: polymerizing a film of said resin so that one face thereof is only partially polymerized and the opposite face is substantially completely polymerized, providing at least one of said substrate and said one face of the resin film with an adhesion promoter comprising an organic substituted, radiation-responsive silane having at least one substituent selected from the group consisting of halogens, alkoxy radicals up to about five carbon atoms, and aryloxy radicals up to about 10 carbon atoms, and at least one organic substituent selected from the group consisting of aliphatic radicals and cycloaliphatic radicals up to about eight carbon atoms and aromatic radicals up to about 12 carbon atoms, superimposing said resinous film and substrate with said silane therebetween, and then subjecting the superimposed film and substrate to high energy radiation thereby completely curing said resinous film and chemically uniting said silane with both the resinous film and substrate.

2. The process of claim 1 wherein said polymerizable resin is an unsaturated polyester resin contained in a solvent including an olefinic compound reactive with said polyester resin.

3. The process of claim 2 wherein said olefinic compound is a vinyl monomer.

4. The process of claim 1 wherein said high energy radiation is electromagnetic radiation.

5. The process of claim 1 wherein said high energy radiation is by particle emission.

6. The process of claim 1 wherein said silane is admixed with said coating resin.

7. The process of claim 1 wherein said silane is applied as a layer between said resinous film and substrate.

8. The process of claim 1 wherein the average energy of said high energy radiation is within the range of about 100 kev. to about 4000 kev.

9. The process of claim 1 wherein said aliphatic and cycloaliphatic radicals contain at least one carbon-to-carbon unsaturation.

10. The process of claim 1 wherein said aromatic radicals contain at least one carbon-to-carbon unsaturation other than aromatic unsaturation.

11. The process of claim 1 wherein said adhesion promoter is a siloxane or polysiloxane of said silane having a molecular weight up to about 10,000.

12. The process of claim 11 wherein said adhesion promoter is a water-soluble salt selected from the group consisting of the water-soluble sodium, potassium, lithium, and ammonium salts of said siloxane or polysiloxanes.

13. The process of claim 1 wherein said silane is cobodied with an alkyd resin.

14. A lamination process for a substantially catalyst-free system containing a polymerizable organic unsaturated coating resin susceptible to free-radical catalysis, comprising: passing a film of said resin through one treating zone providing a non-tacky, mar-resistant finish on one side while leaving at least the opposite side in a relatively tacky, mar-susceptible condition to impart mass integrity to the film and thereby define a sheet, associating the sheet with a cooperating lamina with said opposite side of the sheet facing such lamina, providing at least one of said opposite side and said facing side of the cooperating lamina at any time prior to lamination with an adhesion promoting agent comprising an organic substituted, radiation-responsive silane having at least one substituent selected from the group consisting of halogens, alkoxy radicals up to about five carbon atoms, and aryloxy radicals up to about 10 carbon atoms, and at least one organic substituent selected from the group consisting of aliphatic radicals and cycloaliphatic radicals up to about eight carbon atoms and aromatic radicals up to about 12 carbon atoms, and passing the sheet and cooperating lamina through another treating zone thereby completing the cure of said resin and laminating the sheet to said cooperating lamina, at least one of said treating zones comprising exposure to high energy radiation.

15. A lamination process for a substantially catalyst-free system containing a polymerizable organic thermosetting unsaturated polyester resin, comprising: exposing a film of said resin while overlying a substrate to high energy radiation thereby curing a depthwise segment of the film contiguous to said substrate and providing a non-tacky, mar-resistant undersurface to said film while leaving at least the upper exposed surface in a relatively tacky, mar-susceptible condition, then assembling the film with a cooperating lamina with said upper exposed surface of the film facing the lamina, providing at least one of said upper exposed surface and a facing side of the cooperating lamina at any time prior to lamination with an adhesion promoting agent comprising an organic substituted, radiation-responsive silane having at least one substituent selected from the group consisting of halogens, alkoxy radicals up to about five carbon atoms, and aryloxy radicals up to about 10 carbon atoms, and at least one polymerizable organic substituent having at least one carbon-to-carbon unsaturation other than aromatic unsaturation selected from the group consisting of aliphatic radicals and cycloaliphatic radicals up to about eight carbon atoms and aromatic radicals up to about 12 carbon atoms, and exposing the film and cooperating lamina assembly to high energy radiation thereby completing the cure of said film of polyester resin and chemically uniting said silane with both said resinous film and lamina.

16. The process of claim 1 wherein said substrate has a metallic surface.

References Cited
UNITED STATES PATENTS

| | | | |
|---|---|---|---|
| 2,544,666 | 3/1951 | Goebel et al. | 117—161 X |
| 2,663,694 | 12/1953 | Millar | 260—824 X |
| 2,668,133 | 2/1954 | Brophy et al. | 156—272 |
| 2,763,609 | 9/1956 | Lewis et al. | 204—159.13 |
| 2,897,127 | 7/1959 | Miller | 204—159.14 |
| 2,997,418 | 8/1961 | Lawton | 156—272 X |
| 2,997,419 | 8/1961 | Lawton | 156—272 X |
| 3,210,441 | 10/1965 | Dowling et al. | 260—867 |
| 3,250,642 | 5/1966 | Parasacco et al. | 156—272 X |
| 3,424,638 | 1/1969 | Marans | 156—272 |

CARL D. QUARFORTH, Primary Examiner

E. E. LEHMANN, Assistant Examiner

U.S. Cl. X.R.

117—93.31